3 Sheets—Sheet 1.

B. R. MURPHY.
LOOM FOR WEAVING BLINDS.

No. 170,885. Patented Dec. 7, 1875.

Witnesses:
Geo. H. Howard
H. Anthon.

Inventor:
Benj. R. Murphy
By G. B. Towle
Attorney.

N. PETERS, PHOTO-LITHOGRAPHER, WASHINGTON, D.C.

3 Sheets—Sheet 2.

B. R. MURPHY.
LOOM FOR WEAVING BLINDS.

No. 170,885. Patented Dec. 7, 1875.

Witnesses:
Thos. H. Howard.
H. Anthow.

Inventor:
Benj. R. Murphy
By G. B. Towles.
Attorney.

3 Sheets—Sheet 3.

B. R. MURPHY.
LOOM FOR WEAVING BLINDS.

No. 170,885. Patented Dec. 7, 1875.

Witnesses:
Thos. H. Howard
H. Anthon.

Inventor:
Benj. R. Murphy
By G. B. Towles
Attorney

UNITED STATES PATENT OFFICE.

BENJAMIN R. MURPHY, OF PARKERSBURG, WEST VIRGINIA, ASSIGNOR TO CHARLES A. WADE AND SAMUEL Q. A. BURCHE, OF SAME PLACE.

IMPROVEMENT IN LOOMS FOR WEAVING BLINDS.

Specification forming part of Letters Patent No. 170,885, dated December 7, 1875; application filed July 29, 1875.

*To all whom it may concern:*

Be it known that I, BENJAMIN R. MURPHY, of Parkersburg, in the county of Wood and State of West Virginia, have invented certain new and useful Improvements in Looms for Weaving Blinds and other articles; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
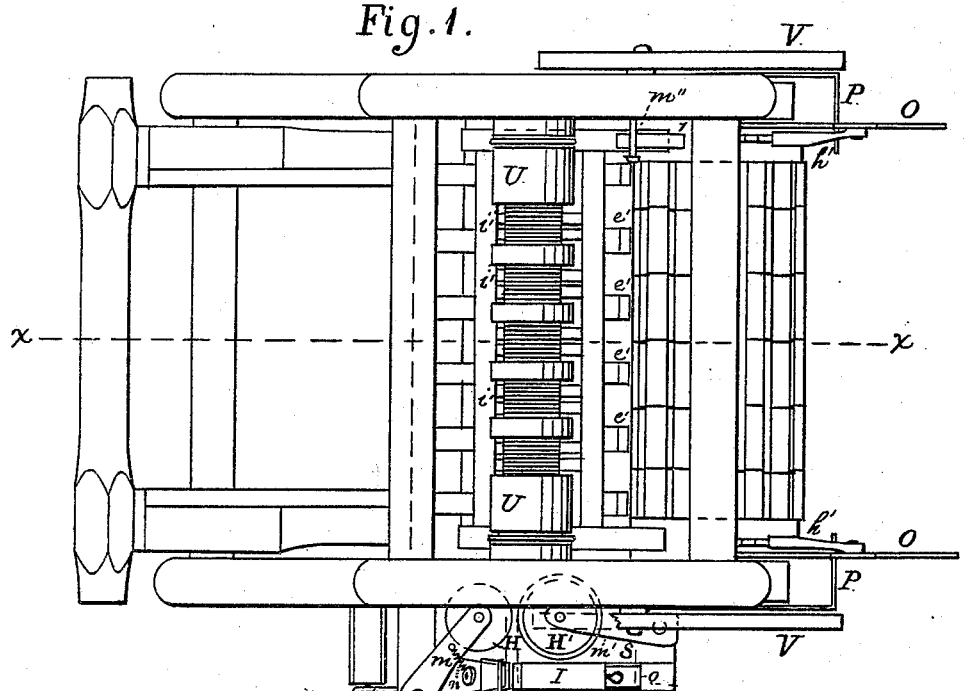
Figure 5:
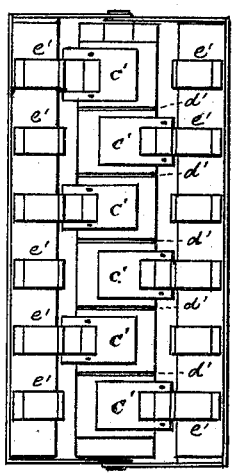
Figure 6:
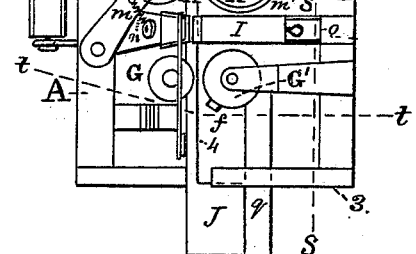
Figure 6:
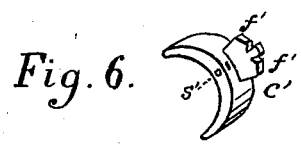
Figure 2:
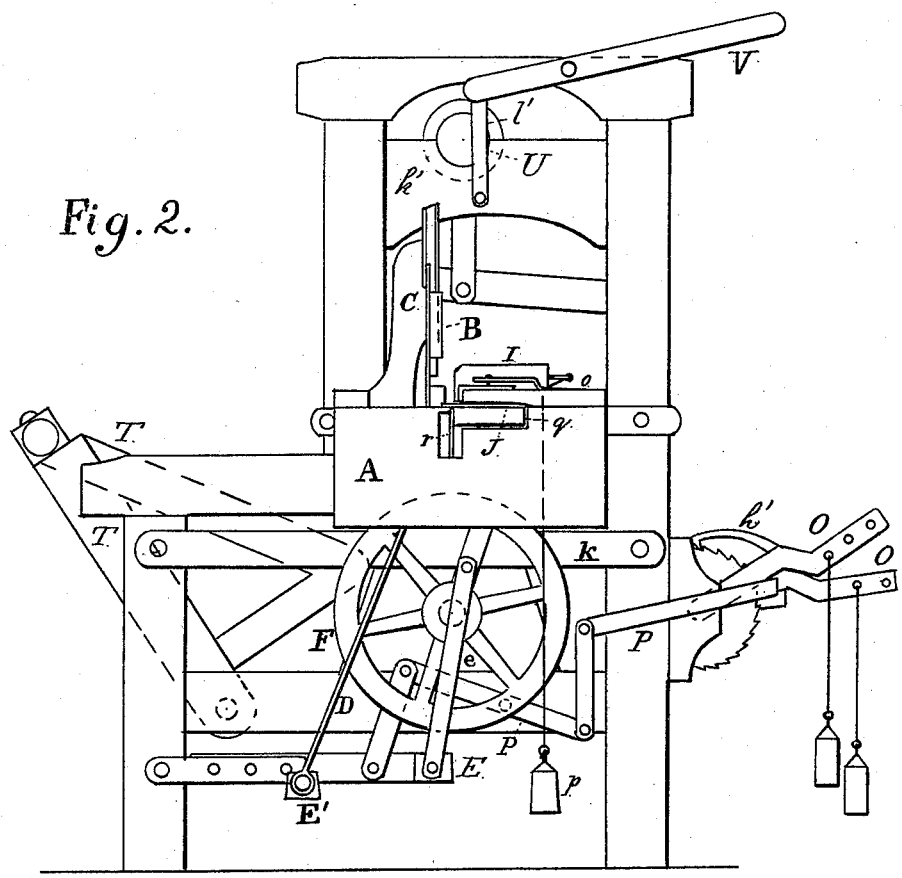
Figure 5:
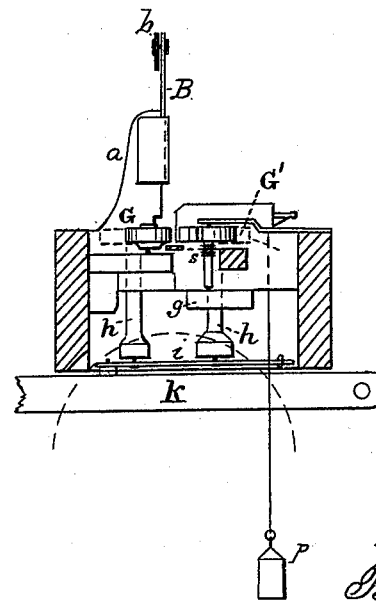
Figure 3:
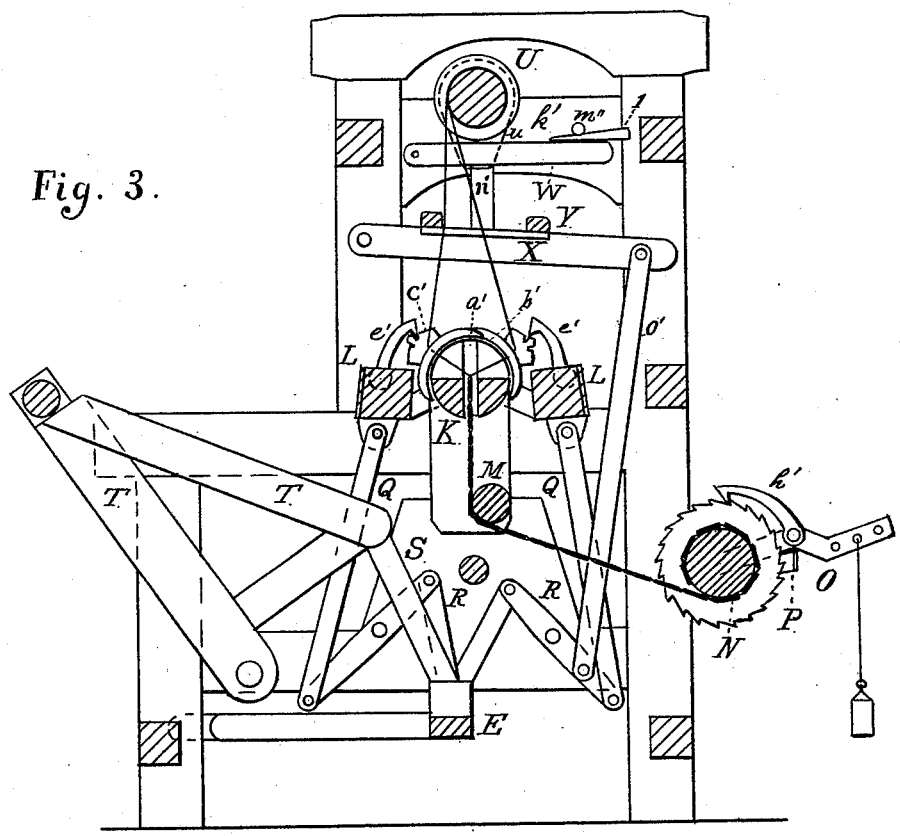
Figure 4:
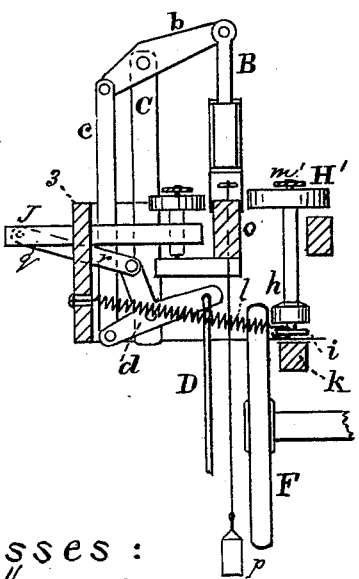

Figure 1 is a plan view of my improved loom for weaving blinds and other similar articles; Fig. 2, a side elevation; Fig. 3, a cross-section, as indicated by the line $x\ x$ of Fig. 1; Fig. 4, a sectional view of the feed mechanism, taken in the line $s\ s$ of Fig. 1; Fig. 5, a sectional view of the same, taken in the line $t\ t$ of the same figure; and Fig. 6, a view of the warp-thread carrier detached from the center-beam.

Like letters in all the figures of the drawings indicate like parts.

This invention relates to a loom for weaving blinds, having feed mechanism constructed so as to deliver or feed the slats automatically into the shed-warp, thus greatly facilitating the operation of weaving the blind; also, in the combination of a slat-adjuster connected with the feed mechanism with the center-beam, so as to keep the slat from rebounding when striking the opposite end of the center-beam, and also adjust and hold it in place; also, in the combination of an adjustable bobbin-holder, having separate apartments or recesses to receive the thread, with the warp-thread carriers and center-beam, so as to give a more equal tension upon the warp, the said holder being more readily filled, and having greater capacity to receive and hold the thread, as will be hereinafter more fully explained.

A is a frame, constructed on the side of the machine, for supporting the feed mechanism; B, a feed-pusher, made to work in the holder $a$, and pivoted to the end of lever $b$, having its fulcrum in the upper end of a standard, C. Pivoted to the opposite end of the lever $b$ is a connecting-rod, $c$, extending down in a parallel line with the pusher, and pivoted to a double crank-lever, $d$, having its fulcrum in the lower end of the standard C. Attached to the opposite end of the crank-lever $d$ is a rod, D, which extends down and connects with the treadle-bar E'. The treadle E receives its motion from the balance-wheel F through connecting-arm $e$; hence, by means of the levers $b\ c\ d$, a reciprocating motion is imparted to the pusher. G G' are auxiliary feed-wheels. Wheel G' is provided on its periphery with a rubber block, $f$, for moving the slat forward, and is rigidly attached to an axle having its bearing in a support-plate, $g$, below. Wheel G has simply a pivotal connection between the standard and pusher-holder. H H' are the main feed-wheels. The periphery of wheel H' is covered with a rubber band to assist in moving the slat forward. The wheels are rigidly attached to axles $h\ h$, which extend down back of the balance-wheel F, and have their bearings in a plate, $i$, pivoted at one end to the cross-brace $k$, the opposite end of the said plate being left free, so that by means of a spiral spring, $l$, connected thereto and to the frame, the axle of wheel H' will be kept in contact with the sides of the balance-wheel, the friction thus produced causing wheel H' to revolve when the machine is set in motion. The tops of the feed-wheel are pivoted in plates $m\ m'$. Plate $m'$ is rigidly attached to the top of the frame, while plate $m$ has a pivoted connection upon the top thereof, so that by means of a spring, $n$, connecting it with the pusher-holder $a$, the wheel H will be caused to press upon wheel H', thus producing the requisite friction to feed the slat forward.

I is a sliding feed-block, having guide-plates on its sides to hold it upon the cross-bar $o$. A cord is attached to the end of the block, which passes under it and down through a hole in the bar, and fastened to a weight, $p$. A groove is made in under the block to allow sufficient play for the rope. When the feed-block has been drawn back, and a sufficient number of slats placed edgewise between it and the pusher-holder $a$, and when a slat has been pressed down by the pusher, another slat is moved up into its place by the feed-block, actuated by the weight $p$. Each slat, as it is pressed down, is caught by the auxiliary feed-wheels, and moved forward to the main feed-wheels, which, revolving with great velocity, throw the slat through the end of the center-beam K into the shed formed by the warp. Wheels G G' are set off at suitable distances apart to receive the slat between them, and yet placed close enough so that the rubber block $f$ will properly act upon the slat and move it forward. J, the slat-adjuster, extends forward to the end of the center-beam K in a line between the feed-wheels, and is attached to a bar, $q$, constructed to slide properly in a slot in the rear end of the frame, and is reciprocated simultaneously with the pusher by means of an arm, $r$, pivoted at one end to the bar of the adjuster, and at the other to the crank of lever $d$. The adjuster is made to operate the feed-wheel G' by a cord, $s$, secured to the rear end of the bar, which, passing along in a groove in the edge thereof, is wound around the axle of said wheel and fastened to the forward end of the bar. Thus, when motion is imparted to the adjuster, the wheel receives a rapid rotary motion, the rubber block acting upon the slat in such a manner as to move it forward to the main feed-wheels, from whence it is thrown through the end of the center-beam K, as before described, the adjuster at the same time keeping the slat from rebounding when striking the opposite end of the beam.

K is the center-beam, provided with a longitudinal slot, $a'$, in the middle to receive the slat, and is rigidly attached to the loom-frame. The beam is circular in form, the upper half over the slot being composed of a metallic cover, $b'$, of a semicircular shape to receive the inner ends of the thread-carriers $c'$, which are made concave to correspond with the shape of the cover. The cover $b'$ is provided with transverse slots or warp-grooves $d'$ to receive the warp. The ends of the beam next to the main feed-wheels H H' are left open to receive the slat, which passes in under the cover $b'$, and thence into the warp-shed, and, striking the opposite end of the center-beam, is kept from rebounding by the adjuster J, as before described.

The outer ends of the warp-thread carriers are provided with double notches to receive the automatic catches or hooks $e'$, hinged upon the reciprocating carriages L L, and with double shoulders $f'$ $f'$, to rest on either side upon the beams of the carriages L L. For each warp-thread carrier there are two automatic catches, $e'$, one on each side of the center-beam K, attached so as to work up and down loosely upon the beams of the carriages. The outer ends of the catches $e'$ are beveled, or constructed so that when the ends of the two rows meet over the center-beam K, those at rest will slide under and loosen those fastened to the thread-carriers on the one side, and automatically fasten themselves to the thread-carriers on the other side, carrying them over by the return of the carriages to the opposite sides of the center-beam K, and drawing the warp through the transverse slots $d'$, thereby crossing the threads over the top of the slats, and forming another shed ready to receive another slat. As the slats are thus woven together they pass down through the longitudinal slot $a'$ and under roller M, and are wound up upon the roller N, which is operated by means of weighted levers O O, pawls $h'$ $h'$, and ratchet-wheels on the ends of roller N, in combination with levers P P, arranged to connect with the treadle E. The treadle, through levers P P, actuates the weighted levers and pawls at both ends of roller N, and in such a manner as to tighten and hold the warp-threads, as well as operate the roller to take up the fabric. The carriages L L have an oscillating motion by means of levers Q Q, connecting the ends of their beams with the ends of the toggle-jointed levers R R, which are pivoted to shoulders in the treadle E, the ends of which extend out beyond the sides of the machine, and connect by arms $e$ $e$ with the balance-wheels F F. The treadle-frame E' E works on pivots attached to the front standards of the machine by means of the arms S S, connecting it with angular lever-frames T T, having their fulcrums on the inner sides of the frame-work of the machine, and provided with a hand-bar, so that the machine can be worked by hand. U is the bobbin-holder, provided with apartments or recesses $i'$ to receive the thread, and placed at a suitable distance above the center-beam K, with its bearings in plates $k'$ $k'$, provided with tongues made to fit and slide in grooves in the upper standards of the machine.

The holder is balanced by weighted levers V V, having their fulcrums in the top cross-beams, and connected by arms $l'$ $l'$ to the plates $k'$ $k'$. A lever, W, is pivoted on the inner side of each plate under the holder, with a band or cord, $u$, fastened around each end of the holder to the lever, so that by means of a wedge, 1, placed on the lever and under a pin, $m''$, attached to each plate $k'$, the tension upon the warp can be regulated more equally than before. A set-screw may be used as an equivalent for the wedge, if preferred.

The holder is operated simultaneously with the other parts of the machine, so that it will accommodate itself to the movement of the warp-thread carriers by means of the levers X X, pivoted to the front upper standards, and connected by links $n'$ $n'$ and $o'$ $o'$ to the toggle-jointed levers R R.

Each warp-thread carrier is provided on each edge, in the center thereof, with an eye, $s'$, and they are placed an equal number on each side of the center-beam K, alternating with the catches $e'$, so as to have a vacant catch between each pair of warp-thread carriers, and a vacant catch and space opposite each warp-thread carrier. The apartments of the holder are filled with two threads each, which are drawn down between the bars of a rack, Y, attached to the levers X X, and inserted one in the eye of a warp-thread carrier on one side of the center-beam, and the other in the eye of a warp-thread carrier on the opposite side. Both threads are then passed through a transverse slot, $d'$, in the center-beam, and drawn down under roller M and fastened to roller N. The bars of the rack serve as guides to keep the thread in a line with the transverse slots.

The operation is as follows: The slats, as many as can be held, are placed edgewise between the feed-pusher and feed-block, the forward ends of the slats resting upon the feed-block bar $o$, and their rear ends upon the rear end bar 3 of the frame. The pusher presses a slat down upon the bar 4 of the adjuster J, whence it is caught between the auxiliary feed-wheels and moved forward to the main feed-wheels, and by their rapid motion thrown through the end of the center-beam K into the warp-shed, and prevented from rebounding, when striking the opposite end of the beam, by the adjuster, as before described, the width of the blind being regulated by placing a stop in a transverse slot, $d'$, at the proper point. At the same time the carriages, rising and approaching each other, cause the ends of the catches to meet and automatically readjust themselves over the top of the center-beam K, and, descending, carry the warp-thread carriers alternately over to opposite sides of the center-beam, crossing the threads over the top of the slat. As soon as a slat is pressed down by the pusher another is pressed forward into its place by the feed-block, the feed-wheels delivering the slats with great rapidity, thus facilitating the operation of weaving the blinds, it having been practically demonstrated that about two hundred yards of blinds can be woven in a day on the said machine, constructed as herein described.

Having thus fully described my invention, what I claim therein as new, and desire to secure by Letters Patent, is—

1. The combination of a feed-pusher, B, and its actuating mechanism, sliding feed-block I, auxiliary feed-wheels G G', main feed-wheels H H', and center-beam K, substantially as and for the purposes set forth.

2. The combination of feed-pusher B and sliding feed-block I and mechanism for operating the same, substantially as set forth.

3. The combination of slat-adjuster J, constructed and operating as described, with the center-beam K, substantially as set forth.

4. The combination of an automatic slat-adjuster, J, and auxiliary feed-wheel G', connected and operating together substantially as set forth.

5. The auxiliary feed-wheel G', provided on its periphery with a rubber block, $f$, in combination with wheel G and slat-adjuster J, substantially as set forth.

6. Wheel H', provided on its periphery with a rubber band, in combination with the balance-wheel F and friction-wheel $h$, substantially as set forth.

7. An automatic feed mechanism consisting of a feed-pusher, B, sliding feed-block I, auxiliary feed-wheels G G', and main feed-wheels H H', constructed and combined to feed the slats into the warp-shed, substantially as set forth.

8. The combination of pusher-holder $a$, feed-pusher B, standard C, levers $b\ c$, double crank-lever $d$, rod D, treadle-bar E, crank-arm $e$, and balance-wheel F, substantially as set forth.

9. An adjustable bobbin-holder having apartments or recesses $i'$ to receive the thread, in combination with the warp-thread carriers $c'$ and center-beam K, substantially as set forth.

10. The rack Y, in combination with the bobbin-holder U and the center-beam K, provided with transverse slots, substantially as set forth.

11. The bobbin-holder U, having its bearings in sliding frames $k'\ k'$, and balanced by means of weighted levers V V, in combination with levers X X, connected with the toggle-jointed levers R R, substantially as set forth.

12. The combination of a wedge, 1, lever W, and pin $m'$ upon the sliding plate $k'$ with the bobbin-holder, substantially as set forth.

In testimony that I claim the foregoing I have hereunto set my hand this 17th day of April, 1875.

B. R. MURPHY.

Witnesses:
C. T. F. GALE,
DANL. D. JOHNSON.